US009276498B2

(12) United States Patent
Lin et al.

(10) Patent No.: US 9,276,498 B2
(45) Date of Patent: Mar. 1, 2016

(54) PHOTOVOLTAIC POWER GENERATION SYSTEM

(71) Applicant: National Central University, Zhongli, Taoyuan County (TW)

(72) Inventors: Faa-Jeng Lin, Zhongli (TW); Kuang-Chin Lu, Zhongli (TW); Hsuan-Yu Lee, Zhongli (TW)

(73) Assignee: NATIONAL CENTRAL UNIVERSITY, Zhongli, Taoyuan County (TW)

( * ) Notice: Subject to any disclaimer, the term of this patent is extended or adjusted under 35 U.S.C. 154(b) by 0 days.

(21) Appl. No.: 14/533,695

(22) Filed: Nov. 5, 2014

(65) Prior Publication Data

US 2015/0365014 A1 Dec. 17, 2015

(30) Foreign Application Priority Data

Jun. 17, 2014 (TW) .............................. 103120773 A (51) Int. Cl.
| | |
|---|---|
| *H02M 1/12* | (2006.01) |
| *H02M 7/44* | (2006.01) |
| *H02M 1/44* | (2007.01) |
| *H02M 1/32* | (2007.01) |
| *H02M 1/00* | (2007.01) |
| *G05F 1/70* | (2006.01) |
| *F03D 9/00* | (2006.01) |

(52) U.S. Cl.
CPC *H02M 7/44* (2013.01); *H02M 1/00* (2013.01); *H02M 1/32* (2013.01); *H02M 1/44* (2013.01); *F03D 9/003* (2013.01); *G05F 1/70* (2013.01); *H02M 2001/0003* (2013.01)

(58) Field of Classification Search
CPC ........... H02M 1/32; H02M 1/44; H02M 1/00; H02M 2001/0003; G05F 1/70; F03D 9/003
USPC .......... 363/40, 74; 323/207; 361/18; 327/141
See application file for complete search history.

(56) References Cited

U.S. PATENT DOCUMENTS

| | | | | |
|---|---|---|---|---|
| 8,467,205 B2* | 6/2013 | Petter | ...................... | F03D 9/003 361/53 |
| 2011/0075456 A1* | 3/2011 | Tan | ......................... | H02M 7/48 363/74 |
| 2011/0130889 A1* | 6/2011 | Khajehoddin | .......... | H02J 3/383 700/298 |
| 2011/0317460 A1* | 12/2011 | Garces Rivera | ........ | H02M 7/48 363/127 |
| 2014/0240880 A1* | 8/2014 | Chen | ........................ | H02H 7/22 361/62 |
| 2014/0307494 A1* | 10/2014 | Wu | ......................... | H02M 7/48 363/97 |

* cited by examiner

*Primary Examiner* — Jessica Han
*Assistant Examiner* — Demetries A Gibson
(74) *Attorney, Agent, or Firm* — Muncy, Geissler, Olds & Lowe, P.C.

(57) ABSTRACT

A photovoltaic power generation system includes a photovoltaic power generation module, a capacitor, a DC/AC voltage converter, a filter, a relay, a PWM controller, a calculation module, a control module, and a grid. The control module traces the maximum power of the photovoltaic power generation module, and detects whether the grid is abnormal or not. Finally, the DC power outputted from the photovoltaic power generation module is transferred to the AC power and outputted to the grid via the DC/AC voltage converter by using the PWM controller.

10 Claims, 5 Drawing Sheets

PHOTOVOLTAIC POWER GENERATION SYSTEM

FIELD OF THE INVENTION

The present invention relates to a field of power generation system, and more particularly relates to a photovoltaic power generation system.

BACKGROUND OF THE INVENTION

In response to the trend of carbon reduction, the world actively promotes green energy industry. Since the global warming issue has not been solved and fossil energy is short in recent year, the development of renewable energy has currently become important in worldwide. Moreover, the related research and application in photovoltaic power is much popular in renewable energy.

On-grid photovoltaic power generation system can be divided into home use and commercial use, and the difference between them is power requirement. The common problems for those power generation systems are power disturbances such as natural disasters (lightning strikes, saline damage) and foreign objects touch. Those power disturbances lead to the power generation system instability so as to cause voltage dip in the grid. Therefore, the overall power generation system is very likely to fail and results in inconvenience for the user terminals. For a user terminal as a large-scale production line, the failure of the power generation system will shut down the production line so as to severely damage the users. In order to overcome the impact of voltage dip, several countries in the world are stipulating power grid rules for low voltage ride through (LVRT) capability. When the voltage dip occurs, the power generation terminal can provide a certain reactive power to the grid until the grid returns to normal in order to prevent power generation loss caused by the separation between the power generation terminal and the user terminal due to voltage dip.

Generally, during the power generating, the power generation system will sent the electricity to the grid through a two-stage voltage conversion mode, which means that the power generating terminal will perform DC/DC voltage conversion in a first boost stage, and then the boosted DC voltage from the first boost stage is inputted to the DC/AC converter in a second boost stage. However, the two boost stages not only consume energy but also increase the size and cost of the power generation system due to the adding of the voltage converters.

Accordingly, the present invention will provide a novel solution for the problems mentioned above.

SUMMARY OF THE INVENTION

In order to solve the aforementioned problems, an object of the present invention is to provide a photovoltaic power generation system, comprising a photovoltaic power generation module, a capacitor, a DC/AC voltage converter, a filter, a relay, a grid, a control module, a calculation module, and a PWM controller. The photovoltaic power generation module includes an output end and the photovoltaic power generation module receives a photovoltaic energy and converts the photovoltaic energy to an electricity with direct current (DC) voltage and generating a DC current. The capacitor is connected to the output end of the photovoltaic power generation module in parallel for receiving the DC voltage to output. The DC/AC voltage converter includes a first input end connected to the capacitor in parallel, a second input end, and an output end, and the DC/AC voltage converter converts the DC voltage to an AC voltage and generates an AC current. The filter includes an input end electrically connected to the output end of the DC/AC voltage converter and an output end, and the filter filters noise in the AC voltage and the AC current. The relay includes an input end electrically connected to the output end of the filter, and an output end. The grid includes an input end electrically connected to the output end of the relay, and an output end. The control module includes a first input end electrically connected to the output end of the photovoltaic power generation module, a second input end electrically connected to the output end of the filter, and an output end. The calculation module includes a first input end electrically connected to the output end of the control module, a second input end electrically connected to the output end of the filter, and an output end. The PWM controller includes an input end electrically connected to the output end of the calculation module, and an output end electrically connected to the second input end of the DC/AC voltage converter. The first input end of the control module is for receiving the DC voltage and the DC current of the photovoltaic power generation module and the control module tracks a power maximum value of the photovoltaic power generation module to calculate a maximum power point voltage in accordance with the DC voltage and the DC current, and the second input end of the control module receives the AC current and the AC voltage from the output end of the filter and a rated current of the DC/AC voltage converter, and the control module calculates a first real power and a first reactive power of the DC/AC voltage converter and a voltage phase angle of the grid in accordance with the AC voltage and the AC current from the filter, and calculates a second real power and a second reactive power of the grid in accordance with the AC voltage from the filter and the rated current of the DC/AC voltage. When the grid became abnormal, the control module outputs an output signal, compares the first real power with the second real power to output a selection signal, and outputs a command current to the first input end of the calculation module in accordance with the selection signal and the output signal. The first input end and the second input end of the calculation module respectively receives the command current and the AC current from the output end of the filter to calculate an error between the AC current and the command current to compensate the error so as to output a command voltage to the PWM controller, and the PWM controller outputs a PWM control signal in accordance with the command voltage and the PWM control signal controls the DC voltage of the capacitor to reach the maximum power point voltage and controls the AC current outputted from the DC/AC voltage converter to be as required for the grid. In the photovoltaic power generation system, the number of the DC/AC voltage converter is one.

The control module of the photovoltaic power generation system includes a maximum power point tracking unit, a first adder-subtracter, a phase lock loop device, a low voltage ride through control device, a second adder-subtracter, a first switch, a second switch, a third adder-subtracter, an intelligent control device, a current protection device, and a coordinate conversion unit. The maximum power point tracking (MPPT) unit is for receiving the DC voltage and the DC current and tracking the power maximum value of the photovoltaic power generation module so as to calculate the maximum power point voltage. The first adder-subtracter includes a first input end receiving the maximum power point voltage from the MPPT unit, a second input end receiving the DC voltage of the photovoltaic power generation module, and an output end outputting a first error value calculated by the first adder-subtracter. The phase lock loop device receives voltage and current from the output end of the filter to calculate the first real power, the first reactive power, and the voltage phase angle of the grid. The low voltage ride through (LVRT) control device receives the first real power, the voltage from the filter, and the rated current of the DC/AC voltage converter, calculates the second real power and the second reactive power of the grid, outputs the output signal when the grid is abnormal, and compares the first real power with the second real power to output the selection signal. The second adder-subtracter includes a first input end receiving the second real power, a second input end receiving the first real power, and an output end outputting a second error value calculated by the second adder-subtracter after receiving the first real power and the second real power. The first switch includes one end receiving the first error value and the other end receiving the second error value, and the first switch selectively outputs the first error value or the second error value in accordance with the selection signal. The second switch includes one end with zero power and the other end receiving the second reactive power from the LVRT control device, and the second switch selectively outputs the zero power or the second reactive power in accordance with the output signal. The third adder-subtracter includes a first input end receiving the first reactive power from the phase lock loop device, a second input end receiving the zero power or the second reactive power from the second switch, and an output end outputting a third error value calculated by the third adder-subtracter after receiving the first reactive power and one of the zero power and the second reactive power. The intelligent control device receives the third error value and one of the first error value and the second error value from the first switch to perform a compensation for the third error value and one of the first error value and the second error value to output a direct axis current and a quadrature axis current. The current protection device receives the quadrature axis current and the direct axis current and limits the current value of the quadrature axis current and the direct axis current. The coordinate conversion unit receives the quadrature axis current and the direct axis current from the current protection device and the voltage phase angle of the grid from the phase lock loop device to perform a coordinate conversion among the quadrature axis current, the direct axis current, and the voltage phase angle to obtain the command current and output the command current to the calculation module.

The intelligent control device of the photovoltaic power generation system is a neural network and comprises an input unit, a processing unit, and an output unit. The input unit receives the third error value and one of the first error value and the second error value from the first switch. The processing unit receives and timely converts the third error value and one of the first error value and the second error value from the input unit to be a function form, and compensates the third error value and one of the first error value and the second error value. The output unit receives the third error value and one of the first error value and the second error value that are converted and compensated by the processing unit and resolves the third error value with the function form to be the direct axis current and resolves one of the first error value and the second error value to be the quadrature axis current.

The intelligent control device of the photovoltaic power generation system is a fuzzy neural network and comprises an input unit, a processing unit, and an output unit. The input unit receives the third error value and one of the first error value and the second error value from the first switch. The processing unit receives and timely converts the third error value and one of the first error value and the second error value from the input unit to be a function form, and compensates the third error value and one of the first error value and the second error value. The output unit receives the third error value and one of the first error value and the second error value that are converted and compensated by the processing unit and resolves the third error value with the function form to be the direct axis current and resolves one of the first error value and the second error value with the function form to be the quadrature axis current.

The grid of the photovoltaic power generation system is a single phase grid or a three phase grid.

The AC current outputted from the filter in the photovoltaic power generation system is a single phase AC current or a three phase AC current.

The voltage outputted from the filter in the photovoltaic power generation system is a single phase voltage or a three phase voltage.

According to the aforementioned description, the photovoltaic power generation system in the present invention can be used to detect abnormal in the grid and using the PWM control signal to control the voltage of the capacitor, which is connected to the DC/AC voltage converter, to satisfy the maximum power point voltage of the photovoltaic power generation module in order to maintain the power balance between the photovoltaic power generation module and the DC/AC voltage converter and to control the AC current from the DC/AC voltage converter to maintain at the required current in the grid in order to prevent generation loss due to voltage dip.

DETAILED DESCRIPTION OF THE PREFERRED EMBODIMENTS

In the following detailed description of the preferred embodiments, reference is made to the accompanying drawings which form a part hereof, and as shown by way of illustration specific embodiments in which the invention may be practiced. In this regard, directional terminology, such as "top," "bottom," "front," "back," "left," "right," "inside," "outside," "side," etc., is used with reference to the orientation of the FIG.(s) being described. As such, the directional terminology is used for purposes of illustration and is in no way limiting the present invention.

Figure 1:
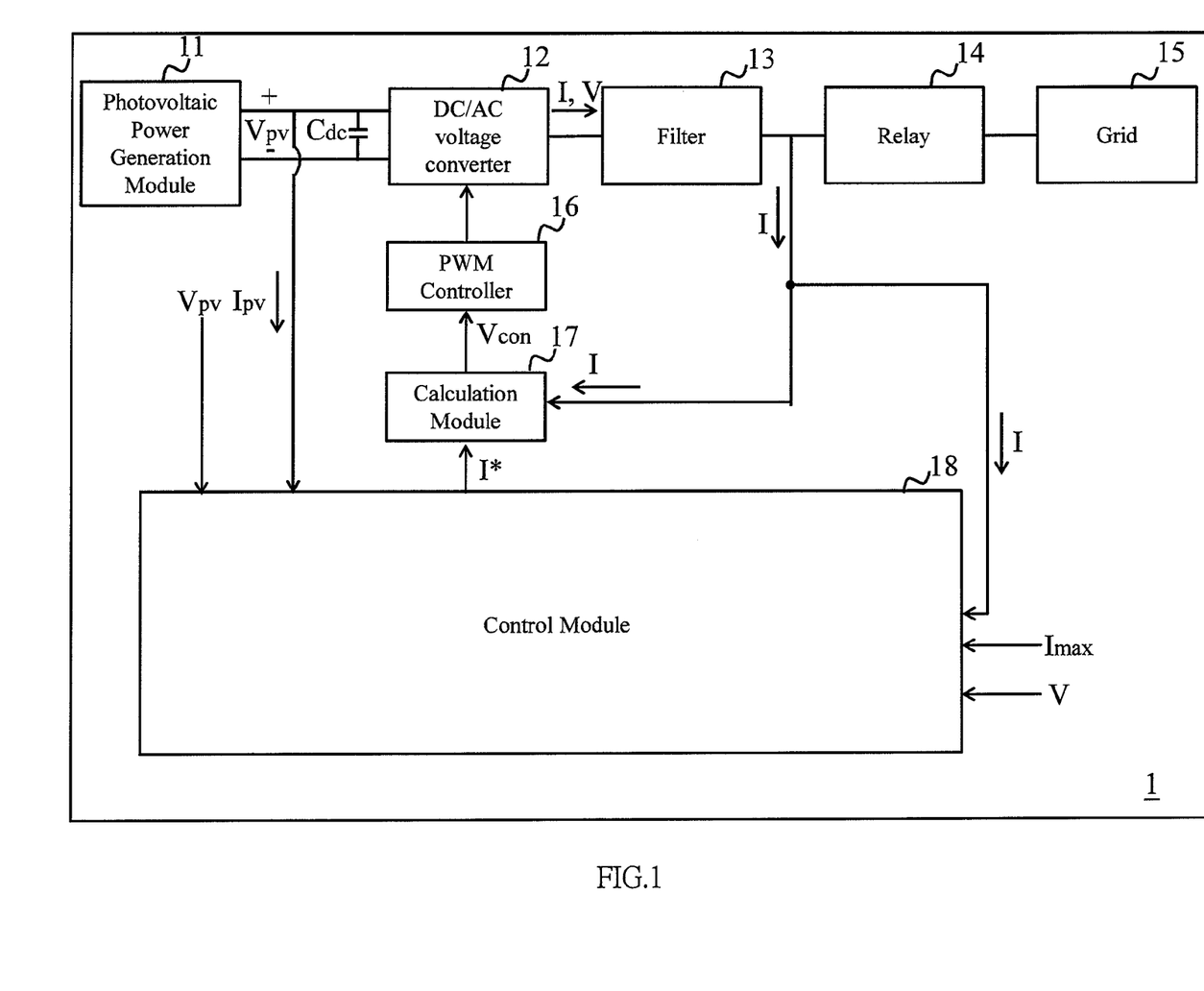
FIG. 1 is a diagram schematically illustrating the photovoltaic power generation system in the present invention.

Firstly, please refer to FIG. 1, the photovoltaic power generation system in the present invention is illustrated.

As shown in FIG. 1, the photovoltaic power generation system 1 of the present invention comprises a photovoltaic power generation module 11, a capacitor Cdc, DC/AC voltage converter 12, a filter 13, a relay 14, a grid 15, a PWM (Pulse Width Modulation) controller 16, a calculation module 17 and a control module 18. In one embodiment, the relay 14 is a solid-state relay (SSR), and the grid 15 is a single phase or a three phase grid. The single phase grid is commonly used in household grid, and its power specification is 220V/60 Hz, and power is about 3 kW 5 kW, but it is not limited herein. The three phase grid is commonly used in commercial or industrial grid, and its power specification is 220V/60 Hz, and power is about 10 kW, but it is not limited herein. The DC/AC voltage converter 12 is to convert DC voltage to AC voltage. When the grid is the single phase grid, the DC/AC voltage converter 12 is a full bridge voltage converter (Full Bridge Inverter). If the grid is the three phase grid, the DC/AC voltage converter 12 is a three phase voltage converter. The connection of the photovoltaic power generation module 11, the capacitor Cdc, the DC/AC voltage converter 12, the filter 13, the relay 14, the grid 15, the PWM controller 16, and the calculation module 17 in the photovoltaic power generation system 11 of the present invention are described below.

Next, please continue to refer to FIG. 1. The photovoltaic power generation module 11 has an output end, and the photovoltaic power generation module 11 receives an external sunlight (not shown), and the sunlight is converted to be DC voltage Vpv with DC current Ipv. The capacitor Cdc and the photovoltaic power generation module 11 are connected in parallel for stabilizing the DC voltage Vpv and the capacitor Cdc outputs the DC voltage Vpv and the DC current Ipv to the DC/AC converter 12. The DC/AC voltage converter 12 includes a first input end, a second input end and an output end. The first input end is electrically connected to the capacitor Cdc. After receiving the DC voltage Vpv from the capacitor Cdc, the DC voltage Vpv is converted to be an AC voltage V with AC current I to output. The filter 13 includes an input end and an output end. The input end is electrically connected to the output end of the DC/AC converter 12 for receiving the AC voltage V and the AC current I from the DC/AC converter 12 and filtering noise in the AC voltage V and the AC current I so as to avoid excessive noise that would interfere voltage and current signals and lower the quality of the overall power generation system. The relay 14 includes an input end and an output end. The input end is electrically connected to the output end of the filter 13. The grid 15 includes an input end and an output end, and the input end is electrically connected to the output end of the relay 14. A control module 18 includes a first input, a second input end and an output end. The first input end is electrically connected to the output end of the photovoltaic power generation module 11 and the second input end is electrically connected to the output end of the filter 13. The calculation module 17 includes a first input end, a second output end and an output end. The first input end is electrically connected to the output end of the control module 18, and the second input end is electrically connected to the output end of the filter 13. The PWM controller 16 includes an input end and an output end. The input end is electrically connected to the output end of the calculation module 17 and the output end is electrically connected to the second input end of the DC/AC voltage converter 12.

Next, please continue to refer to the FIG. 1. When the first input end of the control module 18 receives the DC voltage Vpv and the DC current Ipv from the photovoltaic power generation module 11, the control module 18 uses Incremental Conductance Method (InCon) to track the power maximum value of the photovoltaic power generation module 11 in accordance with the DC voltage Vpv and the DC current Ipv and calculate the maximum power point voltage. The control module 18 tracks the maximum power point voltage of the photovoltaic power generation module 11 at the maximum power to improve the efficiency of photovoltaic power generation. Furthermore, the second input end of the control module 18 receives the AC current I and AC voltage V from the output end of the filter 13 and receives the rated current Imax of the DC/AC voltage converter 12. The rated current Imax is the maximum current value of the AC voltage converter 12. The control module 18 calculates the first real power the first reactive power of the DC/AC voltage converter 12, and the voltage phase angle of the grid 15 in accordance with the AC voltage V and the AC current I from the filter 13. Also, the control module 18 calculates the second real power and the second reactive power actually received by the grid 15 in accordance with the AC voltage V from the filter 13 and the rated current of the DC/AC voltage converter 12. When the control module 18 detects abnormality in the grid 15, the control module 18 outputs an output signal, and the control module 18 compares the first and second real power to output a selection signal. The control module 18 outputs a command current I* to the first input end of the calculation module 17 according to the selection signal and the output signal. The calculation module 17 respectively receives the command current I* and the AC current I from the output end of the filter 13 through the first end and the second end, calculates and compensates the error between the command current I* and the AC current I, and then outputs the command voltage Vcon to the PWM controller 16. After that, the PWM controller 16 outputs the PWM control signal to control the DC voltage Vpv of the capacitor Cdc to reach the maximum power point voltage of the photovoltaic power generation module 11 and to keep the AC current I coming from the DC/AC voltage converter within a current range required for the grid 15. In the present embodiment, the control module 18 timely detects whether an exception of the grid 15 occurs, and the control module 18 also timely controls the AC current I of the DC/AC converter 12 and the DC voltage Vpv of the capacitor Cdc to prevent abnormalities in the grid 15 that would cause large power generation loss. It should be noted that the present invention uses only one voltage converter, i.e. a one-stage voltage conversion rather than two-stage voltage conversion is used, so the photovoltaic power generation system 1 of the present invention can significantly reduce the cost and size so as to increase the use of convenience.

Figure 2:
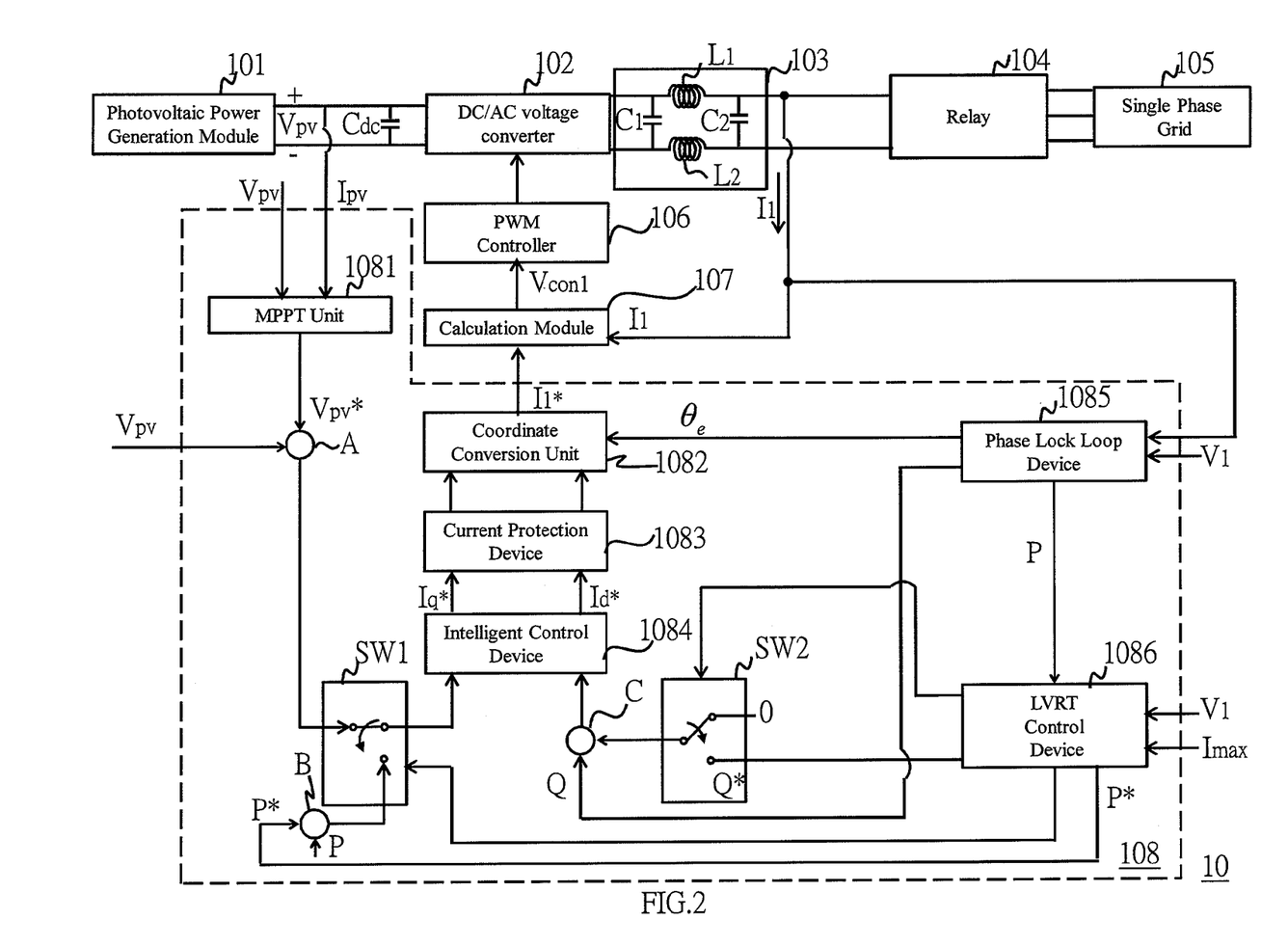
FIG. 2 is a diagram schematically illustrating the photovoltaic power generation system according to a first embodiment of the present invention.

Please refer to FIG. 2, the photovoltaic power generation system according to a first embodiment of the present invention is illustrated.

The photovoltaic power generation system 10 includes a photovoltaic power generation module 101 having an output end to receive and convert the external sunlight to the DC voltage Vpv, and generate the DC current Ipv. The capacitor Cdc and the photovoltaic power generation module 101 are connected in parallel and the capacitor Cdc receives and outputs the DC voltage Vpv. The DC/AC voltage converter 102 includes a first input, a second input end and an output end. The first input end is electrically connected to the capacitor Cdc, and the DC voltage is converted to be the single phase AC voltage V1. The output end of the DC/AC voltage converter 102 outputs the single phase AC voltage V1 and the single phase AC current I1. The π-type filter 103 includes the input end and the output end, and the input end is electrically connected to the output end of the DC/AC voltage converter 102 to filter out the noise in the single phase AC voltage V1 and the single phase AC current I1 to avoid excessive noise that would interfere voltage and current signals. Then, the π-type filter 103 outputs single phase AC voltage V1 and the single phase AC current I1. The π-type filter 103 is composed of the capacitor C1, the capacitor C2, the inductor L1 and the inductor L2. A first end of the inductor L1 is connected to a first end of the first capacitor C1. A second end of the capacitor C1 is electrically connected to a first end of the inductor L2. A second end of the inductor L1 is electrically connected to a first end of the capacitor C2, and a second end of the inductor L2 is electrically connected to a second end of the capacitor C2. The relay 104 has an input end and an output end, and the input end electrically is electrically connected to the output end of the π-type filter 103. The single phase grid 105 includes an input end and an output end, and the input end is electrically connected to the output end of the relay 104. The control module 108 includes a first input end, a second input end and an output end, and the first input end is electrically connected to the output end of the photovoltaic power generation module 101, and the second input end is electrically connected to the output end of the π-type filter 103. The calculation module 107 has a first input end, a second output end and an output end, and the first input end is electrically connected to the output end of the control module 108, the second input end is electrically connected to the output end of the π-type filter 103. The PWM controller 106 includes an input end and an output end, and the input end is electrically connected to the output end of the calculation module 107, and the output end is electrically connected to the second input end of the DC/AC voltage converter 102.

Please continue to refer to FIG. 2, the control module 108 includes a MPPT unit 1081, and the MPPT unit 1081 receives the DC voltage Vpv and the DC current Ipv from the photovoltaic power generation module 101. The control module 108 tracks the power maximum value of the photovoltaic power generation module 101 and calculates the maximum power point voltage Vpv*. The control module 108 tracks the maximum power voltage Vpv* when the photovoltaic power generation module 101 is in the power maximum value to enhance the photovoltaic power generation efficiency. The first adder-subtracter A includes a first input end, a second input end and an output end, wherein the first input end is for receiving the maximum power point voltage Vpv* from the MPPT unit 1081, and the second input end is for receiving the DC voltage Vpv from the photovoltaic power generation module 101. The first adder-subtracter A calculates and outputs a first error value in accordance with the maximum power point voltage Vpv* and the DC voltage Vpv. The phase lock loop device 1085 receives the single phase AC voltage V1 and the signal phase AC current I1 from the π-type filter 103 to calculate the first real power P and the first reactive power Q of the DC/AC voltage converter 102, and the voltage phase angle θe of the single phase grid 105. The LVRT control device 1086 receives the first real power P from the phase lock loop device 1085, the single phase AC voltage V1 from the π-type filter 103, and the rated current Imax of the DC/AC voltage converter 102 to calculate a second real power P* and a second reactive power Q* of the single phase grid 105. When the LVRT control device 1086 timely detects an abnormality occurs in the single phase grid 105, the LVRT control device 1086 outputs an output signal and compares the first and second real power P and P* to output a selection signal. A second adder-subtracter B includes a first input end, a second input end, and an output end, wherein the first input end is for receiving the second real power P* and the second input end is for receiving the first real power P. The second adder-subtracter B receives the second real power P* and the first real power P, calculates a second error value, and outputs the second error value through the output end. The first error value from the first adder-subtracter A is received at one end of the first switch SW1 and the second error value from the second adder-subtracter B is received at the other end of the first switch SW1. The first switch SW1 selectively outputs the first error value or the second error value in accordance with the selection signal from the LVRT control device 1086. One end of the second switch SW2 has a zero power, and the other end thereof receives the second reactive power Q* from the LVRT control device 1086. The second switch SW2 selectively outputs the zero power or the second virtual power output Q* in accordance with the output signal of the LVRT control device 1086. The third adder-subtracter C includes a first input end, a second input end and an output end. The first input end is for receiving a first reactive power Q from the phase lock loop device 1085 and the second input end is for receiving the second reactive power Q* or the zero power 0 from the second switch SW2. The third adder-subtracter C receives the first reactive power Q and one of the zero power 0 and the second reactive power Q*, calculates the third error value, and outputs the third error value through the output end. The intelligent control device 1084 receives the third error value from the third adder-subtracter C and one of the first error value and the second error value from the first switch SW1, performs a compensation for those values, and outputs the quadrature axis current Iq* and the direct axis current Id*. The intelligent control device 1084 can be a neural network (NN) or a fuzzy neural network (FNN). The current protection device 1083 receives the quadrature axis current Iq* and the direct axis current Id* and output them after performing a current limitation for those currents to prevent currents from being too large or too small and therefore causing the power generation system to fail. The coordinate conversion unit 1082 receives the quadrature axis current Iq* and the direct axis current Id* from the current protection device 1083 and the voltage phase angle θe from the phase lock loop device 1085, performs a coordinate conversion among the quadrature current Iq*, the direct axis current Id*, and voltage phase angle θe to obtain the command current I1*, and output the command current I1* to the calculation module 107. The calculation module 107 receives the command current I1* from the control module 108 and the single phase AC current I1 from the π-type filter 103, calculates the error between the command current I1* and the single phase AC current I1 to perform compensation for the error, and outputs the command voltage Vcon1 to the PWM controller 106. The PWM controller 106 receives the command voltage Vcon1 and outputs a PWM control signal to stabilize the DC voltage Vpv of the input capacitance Cdc such that the DC voltage Vpv reaches the maximum power point voltage Vpv* in the photovoltaic power generation module 101 and to control the single phase AC current I1 from the DC/AC voltage converter 102 to be as required for the single phase grid 105.

Please continue to refer to FIG. 2. When the failure in the single phase grid 105 has not occurred, the LVRT control device 1086 did not detect abnormal in the single phase grid 105. Therefore, one end of the second switch SW2 is connected to the zero power and the zero power is outputted to the third adder-subtracter C. The third adder-subtracter respectively receives the first reactive power Q from the phase lock loop device 1085 and the zero power through the first input end and the second input end to calculate the error value between the first reactive power Q and the zero power 0. In addition, one end of the first switch SW1 is connected to the error value (the error value between the DC voltage Vpv and the maximum power point voltage Vpv*) from the first adder-subtracter A. The intelligent control device 1084 receives and compensates the error value from the third adder-subtracter C and the error value from the first switch SW1, and outputs the quadrature axis current Iq* and the direct axis current Id* to the current protection device 1083 to perform the current limitation for those currents in order to prevent currents from being too larger or too small and therefore causing power generation system to fail. The coordinate conversion unit 1082 receives the quadrature axis current Iq* and the direct axis current Id* from the current protection device 1083 and the voltage phase angle θe from the phase lock loop unit 1085, performs coordinate conversion among the quadrature axis current Iq*, the direct axis current Id* and the voltage phase angle θe to obtain a command current I1*, and outputs the command current I1* to the calculation module 107. The calculation module 107 receives the command current I1* from the coordinate conversion unit 1082 and the single phase AC current I1 from the π-type filter 103, calculates and compensates the error between the command current I1* and the single phase AC current I1, and outputs a command voltage Vcon1 to the PWM controller 106. The PWM controller 106 receives the command voltage Vcon1 and outputs a PWM control signal to the DC/AC voltage converter 102 so as to control the DC voltage Vpv of the capacitor Cdc connected to the DC/AC voltage converter 102 such that the DC voltage Vpv reaches the maximum power point voltage Vpv* in the photovoltaic power generation module 101 in order to maintain the power balance between the photovoltaic power generation module 101 and the DC/AC voltage converter 102 and control the single phase AC current I1 from the DC/AC voltage converter 102 to be as required for the grid 105.

Please continue to refer to FIG. 2, when the failure of the single phase grid 105 is occurred, the LVRT control device 1086 detects abnormal in the single phase grid 105 and outputs the output signal to the second switch SW2. One end of the second switch SW2 is connected to the second reactive power Q*, and the second reactive power Q* is outputted to the third adder-subtracter C. The third adder-subtracter C respectively receives the first reactive power Q from the phase lock loop device 1085 and the second reactive power Q* through the first input end and the second input end to calculate the error value between the first reactive power Q and the second reactive power Q*. In addition, the LVRT control device 1086 determines that the first real power P being greater than the second real power P* is a representation of the output power from the photovoltaic power generation module 101 being greater than the requirement for the single phase grid 105. In this situation, the LVRT control device 1086 outputs the selection signal to the first switch SW1 to switch one end of the first switch SW1 to connect to the error value of the second adder-subtracter B, wherein the error value is a difference between the first real power P and the second real power P*. Subsequently, the intelligent control device 1084 receives and compensates the error value from the third adder-subtracter C and the error value from the first switch SW1, and outputs the quadrature axis current Iq* and the direct axis current Id* to the current protection device 1083. The current protection device 1083 performs a current limitation before outputting the quadrature axis current Iq* and the direct axis current Id* to the coordinate conversion unit 1082 in order to prevent those currents from being too large or too small and therefore causing the power generation system to fail. The coordinate conversion unit 1082 receives the quadrature axis current Iq* and the direct axis current Id* from the current protection device 1083 and the voltage phase angle θe from the phase lock loop device 1085, performs the conversion among the quadrature axis current Iq*, the direct axis current Id*, and the voltage phase angle θe, and outputs a command current I1* to the calculation module 107. The calculation module 107 receives the command current I1* from the control module 108 and the single phase AC current I1 from the π-type filter 103 to calculate and compensate the error between the command current I1* and the single phase AC current I1, and outputs the command voltage Vcon1 to the PWM controller 106. The PWM controller 106 receives the command voltage Vcon1 and outputs the PWM control signal to the DC/AC voltage converter 102 in order to control the DC voltage Vpv of the capacitor Cdc connected to the DC/AC voltage converter 102 such that the DC voltage Vpv reaches the maximum power point voltage Vpv* of the photovoltaic power generation module 101 in order to maintain the power balance between the photovoltaic power generation module 101 and the DC/AC voltage converter 102, and to control the single phase AC current I1 of the DC/AC voltage converter 102 to be as required for the single phase power grid 105. In addition, the LVRT control device 1086 determines the first real power P being less than or equal to the second real power P* as the output power of the photovoltaic power generation module 101 being less than or equal to the required power in the single phase grid 105, and tracks the maximum power point voltage Vpv*. In this situation, the LVRT control device 1086 outputs the selection signal to the first switch SW1 to switch one end to the error value from the first adder-subtracter A, wherein the error value is a difference value between the DC voltage Vpc and the maximum power point voltage Vpv*. Subsequently, the intelligent control device 1084 receives and compensates the error value from the third adder-subtracter C and the error value from the first switch SW1, and outputs the quadrature axis current Iq* and the direct axis current Id* to the current protection device 1083. The current protection device 1083 performs current limitation before outputting the quadrature axis current Iq* and the direct axis current Id* to the coordinate conversion unit 1082 in order to prevent those currents from being too large or too small and therefore causing the power generation system to fail. The coordinate conversion unit 1082 receives the quadrature axis current Iq* and the direct axis current Id* from the current protection device 1083 and the voltage phase angle θe from the phase lock loop device 1085 to perform conversion among the quadrature axis current Iq*, the direct axis current Id*, and the voltage phase angle θe to obtain the command current I1*, and outputs the command current I1* to the calculation module 107. The calculation module 107 receives the command current I1* from the control module 108 and the single phase AC current I1 from the π-type filter 103 to calculate and compensate the error value between the command current I1* and the single phase AC current I1, and outputs the command voltage Vcon1 to the PWM controller 106. The PWM controller 106 receives the command voltage Vcon1 and outputs the PWM control signal to the DC/AC voltage converter 102 to control the DC voltage Vpv of the capacitor Cdc connected to the DC/AC voltage converter 102 to reach the maximum power point voltage Vpv* in the photovoltaic power generation module 101 in order to maintain the power balance between the photovoltaic power generation module 101 and the DC/AC voltage converter 102 and to control the single phase AC current I1 of the DC/AC voltage converter 102 to be as required for the single phase grid 105 to avoid the voltage dip in the single phase grid 105.

In this embodiment, the LVRT control device 1086 is designed in accordance with national power requirements, such as IEEE-1547, E.ON and UL-1741, etc., and includes a low voltage ride through function. In addition, the LVRT control device 1086 timely detects abnormal in the single phase grid 105 and timely controls the single phase AC current I1 from the DC/AC voltage converter 102 and the DC voltage Vpv of the capacitor Cdc to prevent large power generation loss because of the malfunction of the single phase grid 105. It should be noted that, in this embodiment, only one voltage converter (one-stage voltage converter) instead of two voltage converters (two-stage voltage converter) is used, and the two-stage voltage converter is generally used in the power generation system, so the photovoltaic power generation system 10 can significantly reduce the cost and size so as to increase use convenience.

Figure 3:
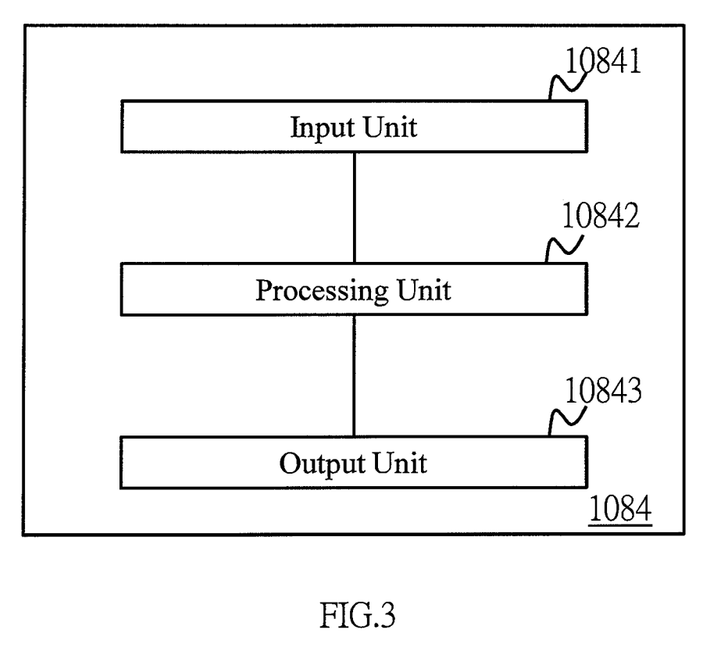
FIG. 3 is a diagram schematically illustrating the intelligent control device in FIG. 2, which is a neural network (NN) or a fuzzy neural network (FNN).

Please refer to FIG. 3, the intelligent control device in FIG. 2 is illustrated, wherein the intelligent control device is a neural network (NN) or a fuzzy neural network (FNN).

When the intelligent control device 1084 is the neural network or the fuzzy neural network, the neural network or the fuzzy neural network includes an input unit 10841, a processing unit 10842, and an output unit 10843. The input unit 10841 receives the first error value or the second error value from the first switch SW1 and the third error value from the third adder-subtracter C to output to the processing unit 10842. The processing unit 10842 receives and converts one of the first error value and the second error value and the third error value to be a function form and timely compensates one of the first error value and the second error value and the third error value to output to the output unit 10843. The output unit 10843 receives and analyzes one of the first error value and the second error value with the function form to be the quadrature axis current Iq* and receives and analyzes the third error value with the function form to be the direct axis current Id*. It should be noted that, when the neural network or the fuzzy neural network is used as the intelligent control device 1084, error compensation can be instantly performed and the intelligent control device 1084 can automatically adjust the error value to be the function form for intelligent control device 1084 to read and calculate. As a consequence, the response rate can be significantly promoted (comparing to the conventional proportional integral controller (PI Controller)), which is required to manually adjust the internal operational parameters to perform error compensation. The intelligent control device 1084 implements the neural network or the fuzzy neural network can timely perform function conversion and compensation and includes advantage of high response rate.

Figure 4:
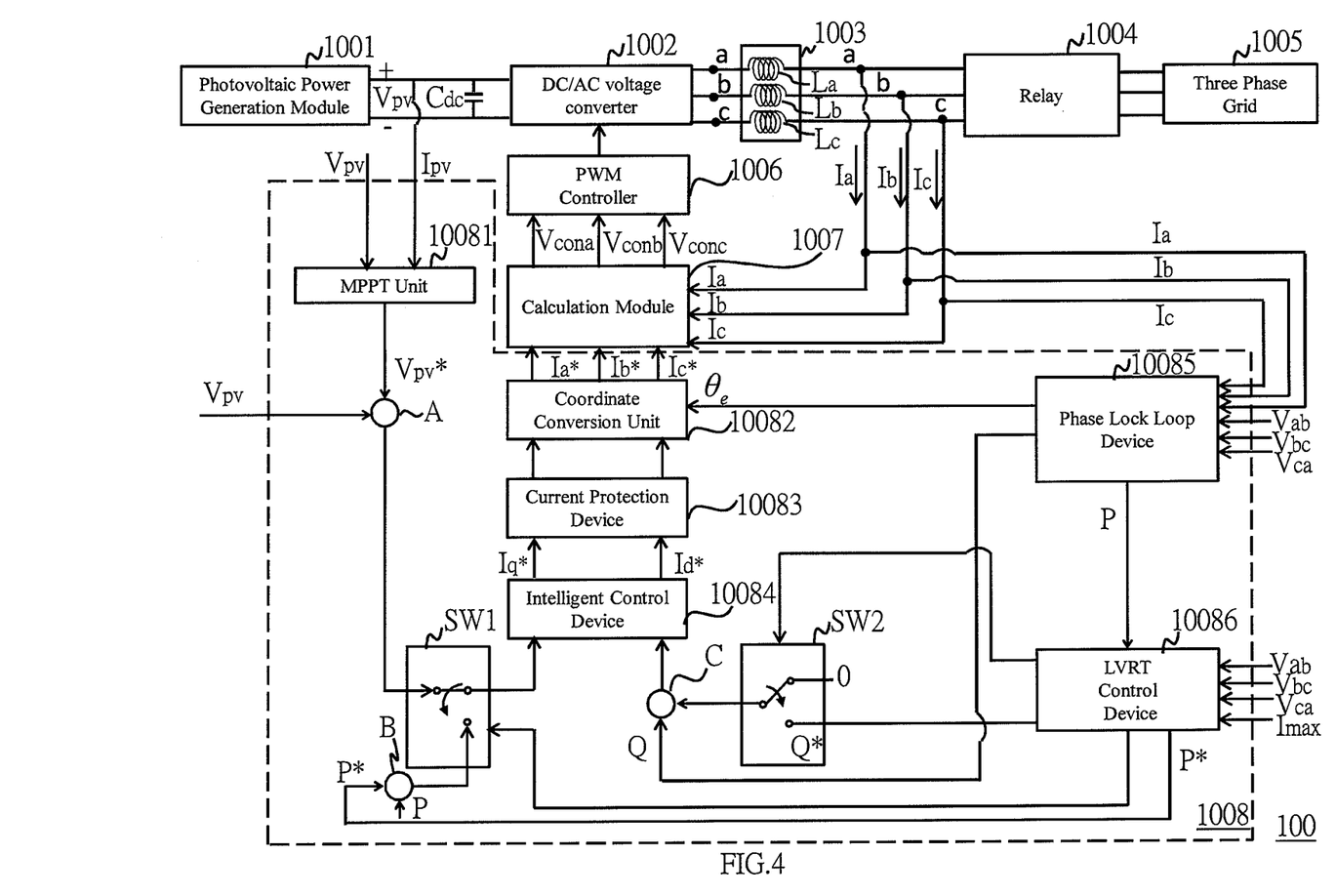
FIG. 4 is a diagram schematically illustrating the photovoltaic power generation system according to a second embodiment.

Please refer to FIG. 4, the photovoltaic power generation system according to a second embodiment is illustrated.

The photovoltaic power generation system 100 includes a photovoltaic power generation module 1001 having an output end. The photovoltaic power generation module 1001 receives an external sunlight, and the external sunlight is converted to be an electricity with a DC voltage Vpv and a DC current Ipv, and the photovoltaic power generation module 1001 outputs the DC voltage and the DC current Ipv through the output end. The capacitor Cdc and the photovoltaic power generation module 1001 are connected in parallel, and the capacitor Cdc receives and outputs the DC voltage Vpv and the DC current Ipv. The DC/AC voltage converter 1002 includes a first input end, a second input end and an output end. The output end has three point ends a, b and c. The first input end is electrically connected to the capacitor Cdc to receive and convert the DC voltage Vpv to be three phase AC voltages Vab, Vbc and Vca and three phase AC current Ia, Ib and Ic. The filter 1003 includes an input end and an output end. The input end is electrically connected to the output end of the DC/AC converter 1002 for filtering the noise in the three phase AC voltages Vab, Vbc and Vca and the three phase AC current Ia, Ib and Ic to avoid that the noise is large enough to interfere the voltage and the current signal. Then, the filter 1003 outputs three phase AC voltages Vab, Vbc and Vca and the three phase AC current Ia, Ib and Ic. The filter 1003 is composed of three inductances La, Lb and Lc. The relay 1004 includes an input end and an output end. The input end is electrically connected to the output end of the filter 1003. The three phase grid 1005 includes an input end and an output end, and the input end is electrically connected to the output end of the relay 1004. The control module 1008 includes a first input end, a second input end and an output end. The first input end is electrically connected to the output end of the photovoltaic power generation module 1001 and the second input end is electrically connected to the output end of the filter 1003. The calculation module 1007 includes a first input end, a second output end and an output end. The first input end is electrically connected to the output end of the control module 1008, and the second input end is electrically connected to the output end of the filter 1003. The PWM controller 1006 includes an input end and an output end. The input end is electrically connected to the output end of the calculation module 1007 and the output end is electrically connected to the second input end of the DC/AC voltage converter 1002.

Please continue to refer to FIG. 4, the control module 1008 includes a MPPT unit 10081, and the MPPT unit 10081 receives the DC voltage Vpv and the DC current Ipv from the photovoltaic power generation module 1001. The control module 1008 tracks the power maximum value of the photovoltaic power generation module 101 and calculates the maximum power point voltage Vpv*. The control module 1008 tracks the maximum power voltage Vpv* when the photovoltaic power generation module 1001 is in the power maximum value to enhance the photovoltaic power generation efficiency. The first adder-subtracter A includes a first input end, a second input end and an output end, and the first input end is for receiving the maximum power point voltage Vpv* from the MPPT unit 10081, and the second input end is for receiving the DC voltage Vpv from the photovoltaic power generation module 1001. The first adder-subtracter A calculates and outputs a first error value in accordance with the maximum power point voltage Vpv* and the DC voltage Vpv. The phase lock loop device 1085 receives the three phase AC voltage Vab, Vbc, and Vca and the three phase AC current Ia, Ib, Ic from the filter 1003 to calculate the first real power P and the first reactive power Q of the DC/AC voltage converter 1002 and the voltage phase angle θe of the single phase grid 105. The LVRT control device 10086 receives the first real power P from the phase lock loop device 10085, the three phase AC voltage Vab, Vbc, and Vca from the filter 1003 and the rated current Imax of the DC/AC voltage converter 1002 to calculate a second real power P* and a second reactive power Q* of the three phase grid 1005. When the LVRT control device 10086 timely detects an abnormality occurs in the three phase grid 1005, the LVRT control device 10086 outputs an output signal and compares the first and second real power P and P* to output a selection signal. A second adder-subtracter B includes a first input end, a second input end and an output end, wherein the first input end is for receiving the second real power P* and the second input end is for receiving the first real power P. The second adder-subtracter B receives the second real power P* and the first real power P to calculate and output a second error value through the output end. The first error value from the first adder-subtracter A is received at one end of the first switch SW1 and the second error value from the second adder-subtracter B is received at the other end thereof. The first switch SW1 outputs the first error value or the second error value in accordance with the selection signal from the LVRT control device 10086. One end of the second switch SW2 has a zero power, and the other end thereof receives the second virtual power Q* from the LVRT control device 10086. The second switch SW2 outputs the zero power or the second reactive power output Q* in accordance with the output signal of the LVRT control device 10086. The third adder-subtracter C includes a first input end, a second input end and an output end. The first input end is for receiving the first reactive power Q from the phase lock loop device 10085 and the second input end is for receiving the second reactive power Q* or the zero power 0 from the second switch SW2. The third adder-subtracter C receives the first reactive power Q and one of the zero power 0 and the second reactive power Q* to calculate the third error value and outputs the third error value through the output end. The intelligent control device 10084 receives the third error value from the third adder-subtracter C and one of the first error value and the second error value from the first switch SW1 to perform the compensation and outputs the quadrature axis current Iq* and the direct axis current Id*. The intelligent control device 10084 can be a neural network (NN) or a fuzzy neural network (FNN). The current protection device 10083 receives the quadrature axis current Iq* and the direct axis current Id* and outputs them after performing current limitation for those currents to prevent currents from being too large or too small and therefore causing the power generation system to fail. The coordinate conversion unit 10082 receives the quadrature axis current Iq* and the direct axis current Id* from the current protection device 10083 and the voltage phase angle θe from the phase lock loop device 10085 to perform a coordinate conversion among the quadrature current Iq*, the direct axis current Id*, and voltage phase angle θe to obtain the command currents Ia*, Ib*, and Ic*, and outputs the command currents Ia*, Ib*, and Ic* to the calculation module 1007. The calculation module 1007 receives the command currents Ia*, Ib*, and Ic* from the control module 1008 and the three phase AC currents Ia, Ib, and Ic from the filter 1003 and calculates the error between the command currents Ia*, Ib*, and Ic* and the three phase AC currents Ia, Ib, and Ic to perform compensation and output the command voltages Vcona, Vconb, and Vconc to the PWM controller 1006. The PWM controller 1006 receives the command voltages Vcona, Vconb, and Vconc to output the PWM control signal to stabilize the DC voltage Vpv of the input capacitance Cdc to reach the maximum power point voltage Vpv* in the photovoltaic power generation module 1001 and to control the three phase AC currents Ia, Ib, and Ic from the DC/AC voltage converter 1002 to be as required for the three phase grid 1005.

Please continue to refer to FIG. 4. When the failure in the three phase grid 1005 has not occurred, the LVRT control device 10086 did not detect abnormal in the three phase grid 1005. On end of the second switch SW2 is connected to the zero power and the zero power is outputted to the third adder-subtracter C. The first input end of the third adder-subtracter C receives the first reactive power Q from the phase lock loop device 10085 and the second input end receives the zero power to calculate the error value between the first reactive power Q and the zero power 0. In addition, one end of the first switch SW1 is connected to the error value (the error value between the DC voltage Vpv and the maximum power point voltage Vpv*) from the first adder subtracter A. The intelligent control device 10084 receives and compensates the error value from the third adder-subtracter C and the error value from the first switch SW1, and outputs the quadrature axis current Iq* and the direct axis current Id* to the current protection device 10083. The current protection device 10083 performs the current limitation in order to prevent currents from being too larger or too small and therefore causing the power generation system to fail. The coordinate conversion unit 10082 receives the quadrature axis current Iq* and the direct axis current Id* from the current protection device 10083 and the voltage phase angle θe from the phase lock loop unit 10085 to perform coordinate conversion among the quadrature axis current Iq*, the direct axis current Id*, and the voltage phase angle θe to obtain the command currents Ia*, Ib* and Ic*, and outputs the command currents Ia*, Ib* and Ic* to the calculation module 1007. The calculation module 1007 receives the command currents Ia*, Ib* and Ic* from the coordinate conversion unit 10082 and the three phase AC currents Ia, Ib and IC from the filter 1003, calculates and compensates the error between the command currents Ia*, Ib* and Ic* and the three phase AC currents Ia, Ib and Ic, and outputs the command voltages Vcona, Vconb and Vconc to the PWM controller 1006. The PWM controller 1006 receives the command voltages Vcona, Vconb and Vconc and outputs the PWM control signal to the DC/AC voltage converter 1002 to control the DC voltage Vpv of the capacitor Cdc connected to the DC/AC voltage converter 1002 such that the DC voltage Vpv reaches the maximum power point voltage Vpv* in the photovoltaic power generation module 1001 in order to maintain the power balance between the photovoltaic power generation module 1001 and the DC/AC voltage converter 1002 and control the three phase AC currents Ia, Ib and Ic from the DC/AC voltage converter 1002 to be as required for the three phase grid 1005.

Please continue to refer to FIG. 4. When the failure of the three phase grid 1005 is occurred, the LVRT control device 10086 detects abnormal in the three phase grid 1005 and outputs the output signal to the second switch SW2. One end of the second switch SW2 is connected to the second reactive power Q*, and the second reactive power Q* is outputted to the third adder-subtracter C. The third adder-subtracter C respectively receives the first reactive power Q from the phase lock loop device 10085 and the second reactive power Q* through the first input end and the second input end to calculate the error value between the first reactive power Q and the second reactive power Q*. In addition, the LVRT control device 10086 determines the first real power P being greater than the second real power P* as the output power from the photovoltaic power generation module 1001 being greater than the requirement for the three phase grid 1005. In this situation, the LVRT control device 10086 outputs the selection signal to the first switch SW1 to switch one end of the first switch SW1 to connect to the error value of the second adder-subtracter B, wherein the error value is a difference between the first real power P and the second real power P. Subsequently, the intelligent control unit 10084 receives and compensates the error value from the third adder-subtracter C and the error value from the first switch SW1 to output the quadrature axis current Iq* and the direct axis current Id* to the current protection device 10083. The current protection device 10083 performs the current limitation to the quadrature axis current Iq* and the direct axis current Id* in order to prevent currents from being too large or too small and therefore causing the power generation system to fail. The coordinate conversion unit 10082 receives the quadrature axis current Iq* and the direct axis current Id* from the current protection device 10083 and the voltage phase angle θe from the phase lock loop device 1085 to perform the conversion among the quadrature axis current Iq*, the direct axis current Id*, and the voltage phase angle θe, and outputs the command current Ia*, Ib* and Ic* to the calculation module 1007. The calculation module 1007 receives the command current Ia*, Ib* and Ic* from the control module 1008 and the three phase AC currents Ia, Ib and Ic from the filter 1003 to calculate and compensate the error between the command currents Ia*, Ib* and Ic* and the three phase AC current Ia, Ib and IC, and outputs the command voltages Vcona, Vconb and Vconc to the PWM controller 1006. The PWM controller 1006 receives the command voltage Vcona, Vconb and Vconc and outputs the PWM control signal to the DC/AC voltage converter 1002 in order to control the DC voltage Vpv of the capacitor Cdc connected to the DC/AC voltage converter 1002 to reach the maximum power point voltage Vpv* of the photovoltaic power generation module 1001 in order to maintain the power balance between the photovoltaic power generation module 1001 and the DC/AC voltage converter 1002 and to control the three phase AC currents Ia, Ib and Ic of the DC/AC voltage converter 1002 to be as required for the three phase power grid 1005. In addition, the LVRT control device 10086 determines the first real power P being less than or equal to the second real power P* as the output power of the photovoltaic power generation module 1001 being less than or equal to the required power in the three phase grid 1005, and tracks the maximum power point voltage Vpv*. In this situation, the LVRT control device 10086 outputs the selection signal to the first switch SW1 to switch one end to the error value from the first adder-subtracter A, wherein the error value is the difference between the DC voltage Vpv and the maximum power point voltage Vpv*. Subsequently, the intelligent control unit 10084 receives and compensates the error value from the third adder-subtracter C and the error value from the first switch SW1, and outputs the quadrature axis current Iq* and the direct axis current Id* to the current protection device 10083. The current protection device 10083 performs current limitation to the quadrature axis current Iq* and the direct axis current Id* in order to prevent currents from being too large or too small and therefore causing the power generation system to fail, and outputs the quadrature axis current Iq* and the direct axis current Id* to the coordinate conversion unit 10082. The coordinate conversion unit 10082 receives the quadrature axis current Iq* and the direct axis current Id* from the current protection device 10083 and the voltage phase angle θe from the phase lock loop device 10085 to perform conversion among the quadrature axis current Iq*, the direct axis current Id* and the voltage phase angle θe, and outputs the command currents Ia*, Ib* and Ic* to the calculation module 1007. The calculation module 1007 receives the command currents Ia*, Ib* and Ic* from the control module 108 and the three phase AC currents Ia, Ib and Ic from the filter 1003, calculates and compensates the error value between the command currents Ia*, Ib* and Ic* and the three phase AC currents Ia, Ib and Ic, and outputs the command voltages Vcona, Vconb and Vconc to the PWM controller 1006. The PWM controller 1006 receives the command voltages Vcona, Vconb and Vconc and outputs the PWM control signal to the DC/AC voltage converter 1002 to control the DC voltage Vpv of the capacitor Cdc connected to the DC/AC voltage converter 1002 to reach the maximum power point voltage Vpv* in the photovoltaic power generation module 1001 in order to maintain the power balance between the photovoltaic power generation module 1001 and the DC/AC voltage converter 1002 and to control the three phase AC currents Ia, Ib and Ic of the DC/AC voltage converter 1002 to be as required for the three phase grid 1005 to avoid the voltage dip in the three phase grid 1005.

In this embodiment, LVRT control device 10086 is set in accordance with national power requirements, such as IEEE-1547, E.ON and UL-1741, etc., which includes a low voltage ride through function. In addition, the LVRT control device 10086 timely detects abnormal in the three phase grid 1005 and timely controls the three phase AC currents Ia, Ib, and Ic from the DC/AC voltage converter 1002 and the DC voltage Vpv of the capacitor Cdc to prevent large power generation loss because of the malfunction of the three phase grid 1005. It should be noted that, in this embodiment, only one voltage converter (one-stage voltage converter) instead of two voltage converters (two-stage voltage converter) is used, so the photovoltaic power generation system 100 can significantly reduce the cost and size so as to increase use convenience.

Figure 5:
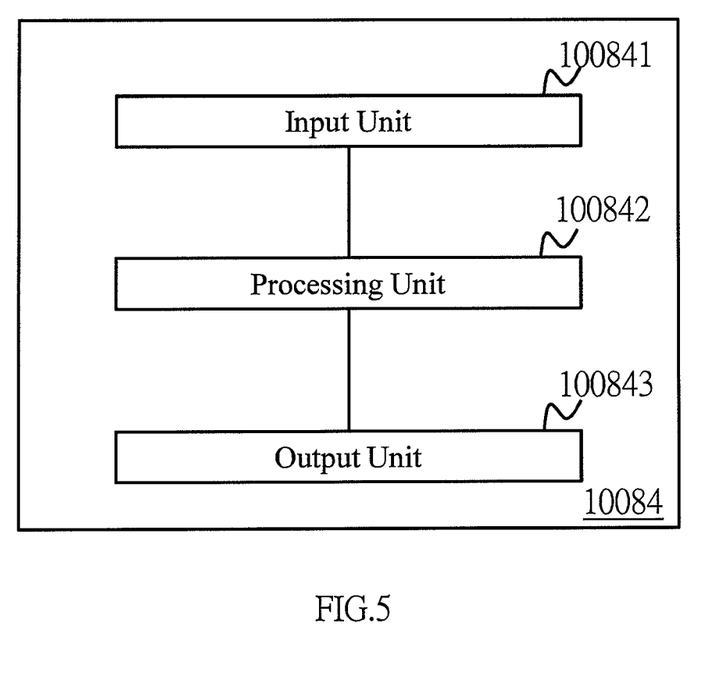
FIG. 5 is a diagram schematically illustrating the intelligent control device in FIG. 4, which is a neural network or a fuzzy neural network.

Please refer to FIG. 5, the intelligent control device as a neural network or a fuzzy neural network is illustrated.

When the intelligent control device 10084 is the neural network or the fuzzy neural network, the neural network or the fuzzy neural network includes an input unit 10841, a processing unit 100842 and an output unit 100843. The input unit 100841 receives the first error value or the second error value from the first switch SW1 and the third error value from the third adder-subtracter C to output to the processing unit 100842. The processing unit 100842 receives and converts one of the first error value and the second error value and the third error value to be a function form and timely compensates one of the first error value and the second error value and the third error value to output to the output unit 100843. The output unit 100843 receives and analyzes one of the first error value and the second error value with the function form to be the quadrature axis current Iq* and receives and analyzes the third error value with the function form to be the direct axis current Id*. It should be noted that, when the neural network or the fuzzy neural network is used as the intelligent control device 1084, error compensation can be instantly performed and the intelligent control device 10084 can automatically adjust the error value to be the function form for intelligent control unit 10084 to read and calculate. As a consequence, compared to the conventional proportional integral controller which performs error compensation by manually adjusting the internal operational parameters, the intelligent control device 1084 has significantly promoted response rate. The intelligent control device 10084 implementing the neural network or the fuzzy neural network is able to perform function conversion and compensation in real time and has advantage of high response rate.

As described above, the present invention has been described with preferred embodiments thereof and it is understood that many changes and modifications to the described embodiments can be carried out without departing from the scope and the spirit of the invention that is intended to be limited only by the appended claims.

What is claimed is:
1. A photovoltaic power generation system, comprising:
a photovoltaic power generation module including a output end, and the photovoltaic power generation module receives a photovoltaic energy and converts the photovoltaic energy to an electricity with a DC voltage and a DC current;
a capacitor connected to the output end of the photovoltaic power generation module in parallel for receiving and outputting the DC voltage;
a DC/AC voltage converter including a first input end connected to the capacitor in parallel, a second input end, and a output end, the DC/AC voltage converter converting the DC voltage to an AC voltage and generating an AC current;
a filter including an input end electrically connected to the output end of the DC/AC voltage converter, and an output end, the filter filtering noises in the AC voltage and the AC current;
a relay including an input end electrically connected to the output end of the filter, and an output end;
a grid including an input end electrically connected to the output end of the relay, and an output end;
a control module including a first input end electrically connected to the output end of the photovoltaic power generation module, a second input end electrically connected to the output end of the filter, and an output end;

a calculation module including a first input end electrically connected to the output end of the control module, a second input end electrically connected to the output end of the filter, and an output end; and a PWM controller including an input end electrically connected to the output end of the calculation module, and an output end electrically connected to the second input end of the DC/AC voltage converter;

wherein the first input end of the control module is for receiving the DC voltage and the DC current of the photovoltaic power generation module, and the control module tracks a power maximum value of the photovoltaic power generation module to calculate a maximum power point voltage in accordance with the DC voltage and the DC current, and the second input end of the control module receives the AC current and the AC voltage from the output end of the filter and a rated current of the DC/AC voltage converter, and the control module calculates a first real power and a first reactive power of the DC/AC voltage converter, and a voltage phase angle of the grid in accordance with the AC voltage and the AC current from the filter, and the control module calculates a second real power and a second reactive power of the grid in accordance with the AC voltage from the filter and the rated current of the DC/AC voltage;

wherein when the grid became abnormal, the control module outputs an output signal, compares the first real power with the second real power to output a selection signal, and outputs a command current to the first input end of the calculation module in accordance with the selection signal and the output signal, and the first input end and the second input end of the calculation module respectively receives the command current and the AC current from the output end of the filter to calculate an error between the AC current and the command current to compensate the error so as to output a command voltage to the PWM controller, and the PWM controller outputs a PWM control signal in accordance with the command voltage, and the PWM control signal controls the DC voltage of the capacitor to reach the maximum power point voltage and controls the AC current outputted from the DC/AC voltage converter to be as required for the grid; and wherein the number of the DC/AC voltage converter is one.

2. The photovoltaic power generation system according to claim 1, wherein the control module includes a maximum power point tracking (MPPT) unit receiving the DC voltage and the DC current and tracking the power maximum value of the photovoltaic power generation module so as to calculate the maximum power point voltage;

a first adder-subtracter including a first input end receiving the maximum power point voltage from the MPPT unit, a second input end receiving the DC voltage of the photovoltaic power generation module, and an output end outputting a first error value calculated by the first adder-subtracter;

a phase lock loop device receiving voltage and current from the output end of the filter to calculate the first real power, the first reactive power, and the voltage phase angle of the grid;

a low voltage ride through (LVRT) control device receiving the first real power, the voltage from the filter, and the rated current of the DC/AC voltage converter, calculating the second real power and the second reactive power of the grid, outputting the output signal when the grid is abnormal, and comparing the first real power with the second real power to output the selection signal;

a second adder-subtracter including a first input end receiving the second real power, a second input end receiving the first real power, and an output end outputting a second error value calculated by the second adder-subtracter after receiving the first real power and the second real power;

a first switch including one end receiving the first error value and the other end receiving the second error value, and the first switch selectively outputting the first error value or the second error value in accordance with the selection signal;

a second switch including one end with zero power and the other end receiving the second reactive power from the LVRT control device, and the second switch selectively outputting the zero power or the second reactive power in accordance with the output signal;

a third adder-subtracter including a first input end receiving the first reactive power from the phase lock loop device, a second input end receiving the zero power or the second reactive power from the second switch, and an output end outputting a third error value calculated by the third adder-subtracter after receiving the first reactive power and one of the zero power and the second reactive power;

an intelligent control device receiving the third error value and one of the first error value and the second error value from the first switch to perform a compensation for the third error value and one of the first error value and the second error value to output a direct axis current and a quadrature axis current;

a current protection device receiving the quadrature axis current and the direct axis current and limiting the current value of the quadrature axis current and the direct axis current;

a coordinate conversion unit receiving the quadrature axis current and the direct axis current from the current protection device and the voltage phase angle of the grid from the phase lock loop device to perform a coordinate conversion among the quadrature axis current, the direct axis current, and the voltage phase angle to obtain the command current and output the command current to the calculation module.

3. The photovoltaic power generation system according to claim 2, wherein the intelligent control device is a neural network comprising:

an input unit receiving the third error value and one of the first error value and the second error value from the first switch;

a processing unit receiving and timely converting the third error value and one of the first error value and the second error value from the input unit to be a function form, and compensating the third error value and one of the first error value and the second error value; and an output unit receiving the third error value and one of the first error value and the second error value that are converted and compensated by the processing unit and resolving the third error value with the function form to be the direct axis current and resolving one of the first error value and the second error value with the function form to be the quadrature axis current.

4. The photovoltaic power generation system according to claim 2, wherein the intelligent control device is a fuzzy neural network comprising:

an input unit receiving the third error value and one of the first error value and the second error value from the first switch;

a processing unit receiving and timely converting the third error value and one of the first error value and the second error value from the input unit to be a function form, and compensating the third error value and one of the first error value and the second error value; and an output unit receiving the third error value and one of the first error value and the second error value that are converted and compensated by the processing unit and resolving the third error value with the function form to be the direct axis current and resolving one of the first error value and the second error value with the function form to be the quadrature axis current.

5. The photovoltaic power generation system according to claim 1, wherein the grid is a single phase grid.

6. The photovoltaic power generation system according to claim 1, wherein the grid is a three phase grid.

7. The photovoltaic power generation system according to claim 1, wherein the AC current outputted from the filter is a single phase AC current.

8. The photovoltaic power generation system according to claim 1, wherein the AC current outputted from the filter is a three phase AC current.

9. The photovoltaic power generation system according to claim 1, wherein the voltage outputted from the filter is a single phase voltage.

10. The photovoltaic power generation system according to claim 1, wherein the voltage outputted from the filter is a three phase voltage.

* * * * *